US011567808B2

(12) United States Patent
Gera et al.

(10) Patent No.: US 11,567,808 B2
(45) Date of Patent: Jan. 31, 2023

(54) DEPENDENCY HANDLING FOR CONFIGURATION TRANSPORT

(71) Applicant: SAP SE, Walldorf (DE)

(72) Inventors: Gaurav Loknath Gera, Vadodara (IN); Martin Steiert, Heidelberg (DE); Martina Keller, Niefern (DE); Sameer Kumar, New Delhi (IN); Thomas Gieselmann, Weinheim (DE); Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 234 days.

(21) Appl. No.: 16/712,386

(22) Filed: Dec. 12, 2019

(65) Prior Publication Data

US 2021/0182115 A1 Jun. 17, 2021

(51) Int. Cl.
*G06F 9/50* (2006.01)
*G06F 16/21* (2019.01)
*G06F 16/27* (2019.01)
*G06F 16/22* (2019.01)

(52) U.S. Cl.
CPC .......... *G06F 9/5077* (2013.01); *G06F 16/213* (2019.01); *G06F 16/2282* (2019.01); *G06F 16/27* (2019.01)

(58) Field of Classification Search
CPC .... G06F 9/5077; G06F 16/27; G06F 16/2282; G06F 16/213
See application file for complete search history.

(56) References Cited

U.S. PATENT DOCUMENTS

| 2011/0302212 A1* | 12/2011 | Agrawal | G06F 16/24565 707/805 |
| 2012/0166488 A1* | 6/2012 | Kaushik | G06F 21/6209 707/795 |
| 2013/0124529 A1* | 5/2013 | Jacob | G06F 9/44505 707/740 |
| 2018/0253481 A1* | 9/2018 | Heidel | G06F 16/273 |
| 2019/0372766 A1* | 12/2019 | Bahrenburg | G06F 21/6272 |
| 2020/0007529 A1* | 1/2020 | Bahrenburg | H04L 63/08 |
| 2021/0165760 A1* | 6/2021 | De Schrijver | G06F 16/1844 |

* cited by examiner

*Primary Examiner* — Ashish Thomas
*Assistant Examiner* — Dustin D Eyers
(74) *Attorney, Agent, or Firm* — Buckley, Maschoff & Talwalker LLC

(57) ABSTRACT

Systems and methods include reception of an indication of a first data object to transmit from a first database tenant to a second database tenant, the first data object comprising user configuration settings metadata of a database application and associated with a first data object type, determination of whether a dependent data object may be associated with a data object of the first data object type, determination, if it is determined that a dependent data object may be associated with a data object of the first data object type, of whether a dependent object is dependent on the first data object, and automatic determination, if it is determined that a dependent object is dependent on the first data object, to transmit the dependent object from the first database tenant to the second database tenant.

20 Claims, 6 Drawing Sheets

DEPENDENCY HANDLING FOR CONFIGURATION TRANSPORT

BACKGROUND

Conventional database systems may be deployed in a multi-tenant architecture, in which a single computing platform executes multiple logical database systems which are programmatically isolated from one another. The platform stores metadata and master data of each tenant in a manner such that a database management system instance associated with one tenant is unable to access the metadata and master data of another tenant. In some examples, one tenant is a development and/or testing system another tenant is a production system.

Database applications running on a database system support customization of application components, or entities, such as extension fields, user interface layout, roles, etc. These customizations are tenant-specific and do not affect other tenants which may be executing on a given computing platform. Settings metadata describing these customizations is stored in association with the affected tenant.

It may be desired to transport some customization settings from one tenant to another. Conventionally, transport involves downloading a file from the source tenant to a local computer, and transferring the file to the target tenant. Transport of some customized entities may require special software and/or may only be performed by special users. In the case of some entities, no transport mechanism exists and the customization must be manually carried out in the target tenant.

Systems are desired to facilitate the transport of configuration settings between tenants.

DETAILED DESCRIPTION

The following description is provided to enable any person in the art to make and use the described embodiments. Various modifications, however, will remain readily-apparent to those in the art.

A dependency may exist between an entity of a source tenant and another entity of the source tenant. The dependency may be mandatory (i.e., the source tenant entity is unusable without the other entity) or optional (i.e., the source tenant entity may be used without the other entity). Transport of an entity to a target system which does not include a dependent entity may therefore cause the transported entity to be unusable in the target tenant (in a case that the dependency is mandatory) or to operate in a less-than-optimal manner (in a case that the dependency is optional).

Some embodiments facilitate the transport of configuration entities from a source database tenant to a target database tenant. Embodiments may facilitate the efficient identification and addition of dependent entities within the transport process.

According to some embodiments, each entity is associated with an entity type. Upon receiving a request to transport an entity of a given entity type, it is determined whether a dependency is permitted to exist between an entity of the given type and another entity. If so, an entity provider associated with the entity type is queried to determine whether a mandatory dependency exists between the entity and one or more other entities. The one or more other entities, if any, are then automatically added to the transport request.

Some embodiments allow a user to request a proposal of additional entities to add to the transport request. As mentioned above, an optional dependency may exist between an entity and one or more other entities. In response to a request for a proposal, any entities on which the already-added entities are optionally-dependent are presented for possible addition to the transport request.

Figure 1:
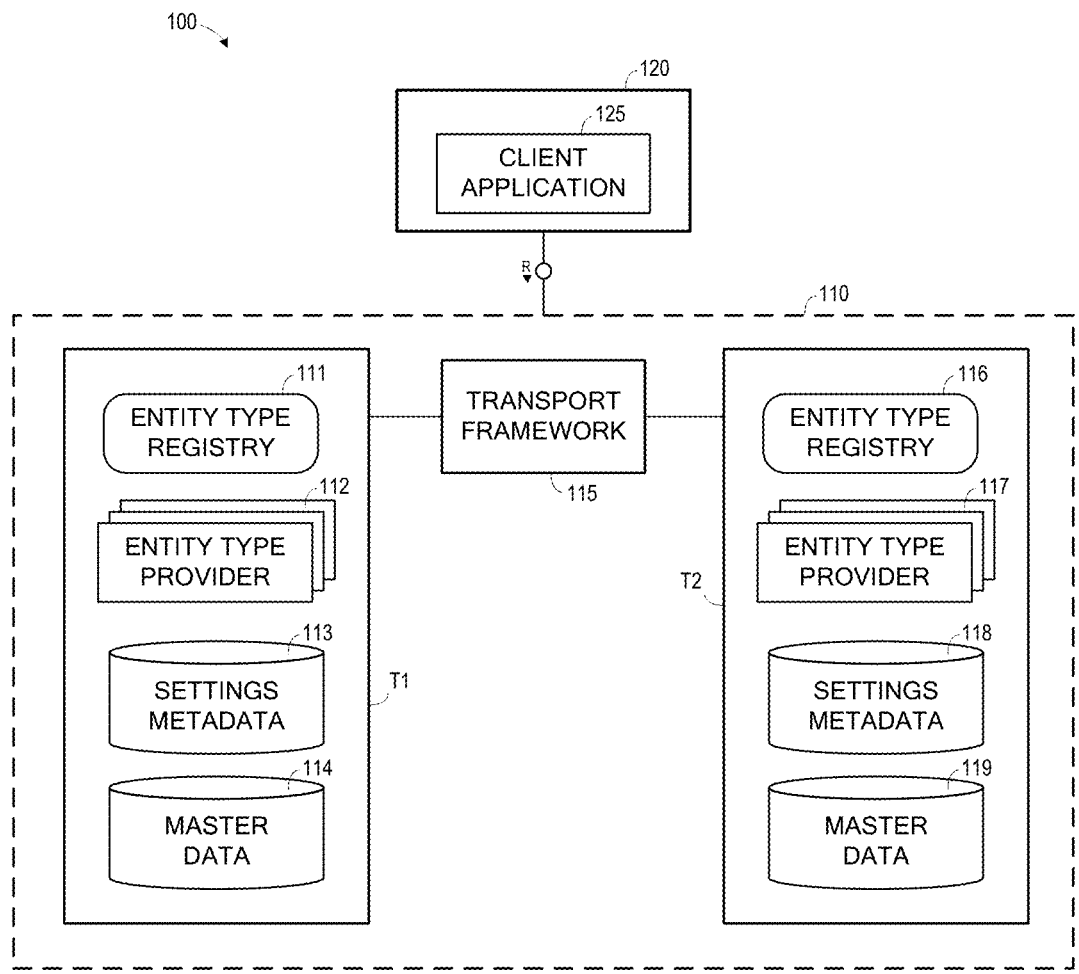
FIG. 1 is a multi-tenant architecture for transporting entities from a source tenant to a target tenant according to some embodiments.

FIG. 1 illustrates architecture 100 according to some embodiments. Architecture 100 includes database computing platform 110. Platform 110 may comprise any computing system capable of executing a database management system, of storing and independently managing data of one or more tenants and, in some embodiments, of supporting the execution of database server applications. Platform 110 may include a distributed storage system and/or distributed server nodes for performing computing operations as is known in the art.

Platform 110 of the present example includes tenant T1 and tenant T2. Tenant T1 includes entity type registry 111, entity type providers 112, settings metadata 113 and master data 114. Similarly, tenant T2 includes entity type registry 116, entity type providers 117, settings metadata 118 and master data 119. Tenants T1 and T2 are not limited to the illustrated components. Moreover, although the components are depicted as physically separated from one another, multiple components may be integrated with one another. For example, master data 114 and master data 119 may be interspersed within a common storage system, with access to each being controlled via multi-tenant functionality of the multi-tenant database management system of platform 110.

According to one example, tenant T1 may comprise a development tenant for a cloud-based deployment and tenant T2 may comprise a production tenant for the cloud-based deployment. In another example, tenant T1 may comprise an integration test tenant for a cloud-based deployment and tenant T2 may comprise a user acceptance test tenant for the cloud-based deployment. Embodiments are not limited to these examples.

Client device 120 executes client application 125 to communicate with platform 110. Client application 125 may comprise code executing within a Web browser executed by client device 120 according to some embodiments. Client application 125 may communicate with one or more server applications (not shown) executing on platform 110 to provide functionality to a user based on master data of tenant T1 or T2. An administrator may operate client application 125 to manage tenants T1 and T2 and/or a database management system of platform 110.

Upon installation, each tenant may comprise settings metadata defining identical sets of application entities. An administrator or other user may operate client application 125 to customize entities of tenant T1. Such customization would result in corresponding modifications to settings metadata 113. As noted above, such customization would not affect settings metadata 118 of tenant T2 and would therefore not change the entities of tenant T2.

Transport framework 115 provides user interfaces and functionality for transporting configuration settings from a source tenant (e.g., tenant T1) to a target tenant (e.g., tenant T2). According to some embodiments, a user may operate client application 125 to interact with transport framework 115 in order to define a transport route (i.e., a source tenant and a target tenant), create a transport request, add entities to the transport request, assemble the transport request, and release the transport request. Transport framework 115 may further operate to deploy the transport request in the target tenant.

According to some embodiments, configuration entities as described herein may include but are not limited to language adaptations, screen adaptations in the master layout, extension fields, page layouts, business roles, mashups, code lists and offline templates. Configuration entities differ from master data entities (e.g., customers, prospects, suppliers, sites, accounts), instances of which are stored in master data 114 and master data 119.

The data stored within platform 110 may comprise one or more of conventional tabular data, row-based data, column-based data, and object-based data. The data may be distributed among several relational databases, dimensional databases, and/or other data sources. Moreover, the data may be indexed and/or selectively replicated in an index to allow fast searching and retrieval thereof.

Platform 110 may implement an "in-memory" database, in which a full database is stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of entity type providers 112 and 117 comprises a software component for providing functions related to a respective transportable entity type. For example, one entity type provider 112 may provide functions related to adaptation change entities and another entity type provider may provide functions related to business role entities. According to some embodiments, each entity type provider 112 maintains metadata defining each tenant entity associated with its respective entity type. Such metadata may include identifiers of any dependent entities, as well as an indication of whether each identified dependency is mandatory or optional.

Entity type providers 112 and 117 are registered in respective entity type registries 111 and 116. A registry entry associated with a particular entity type provider 112 may indicate whether the associated entity type supports dependent entities. Such an indication may be used as described below in the determination of dependent entities according to some embodiments. An entity type may include one or more entity sub-types, and a registry entry associated with a particular entity type provider 112 may also indicate whether each particular sub-type supports dependent entities.

A mandatory dependency as described herein exists if a source entity requires the dependent entity for proper activation on the target tenant. For example, a customized business role entity may be associated with an extension field restriction. However, if only the business role entity is transported to a target system and the extension field is not, the business role entity will be invalid on the target system.

An optional dependency exists if a source entity does not require the dependent entity for proper activation on the target tenant. For example, a code list custom order can be assigned to a user interface component via an adaptation change, but this assignment is not necessary to create the code list custom order on the target tenant. According to some embodiments, a user may ask the system to determine whether any optional dependencies are associated with an entity to be transported, and may then choose which of any optionally-dependent entities to add to the transport request.

Figure 2:
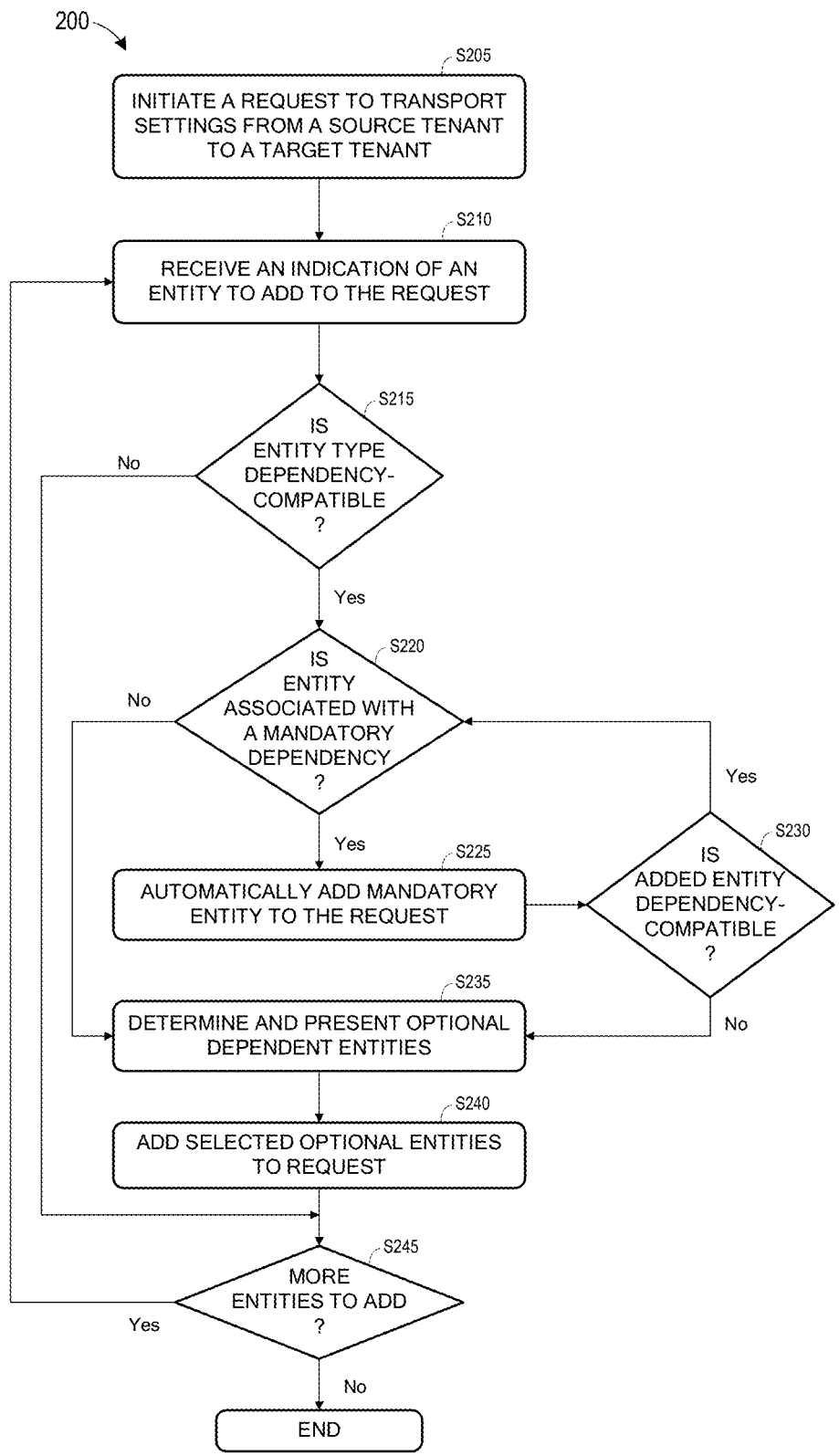
FIG. 2 is flow diagram of a process to determine dependent entities for transport from a source tenant to a target tenant according to some embodiments.

FIG. 2 is a flow diagram of process 200 according to some embodiments. Process 300 and the other processes described herein may be performed using any suitable combination of hardware and software. Software program code embodying these processes may be stored by any non-transitory tangible medium, including a fixed disk, a volatile or non-volatile random access memory, a DVD, a Flash drive, or a magnetic tape, and executed by any number of processing units, including but not limited to processors, processor cores, and processor threads. Such processors, processor cores, and processor threads may be implemented by a virtual machine provisioned in a cloud-based architecture. Embodiments are not limited to the examples described below.

It will be assumed that, prior to process 200, one or more customized entities have been defined at tenant T1. The customized entities may be associated with mandatory or optional dependencies as described above. The dependencies may be defined as mandatory or optional by the creator of the entity.

Figure 3:
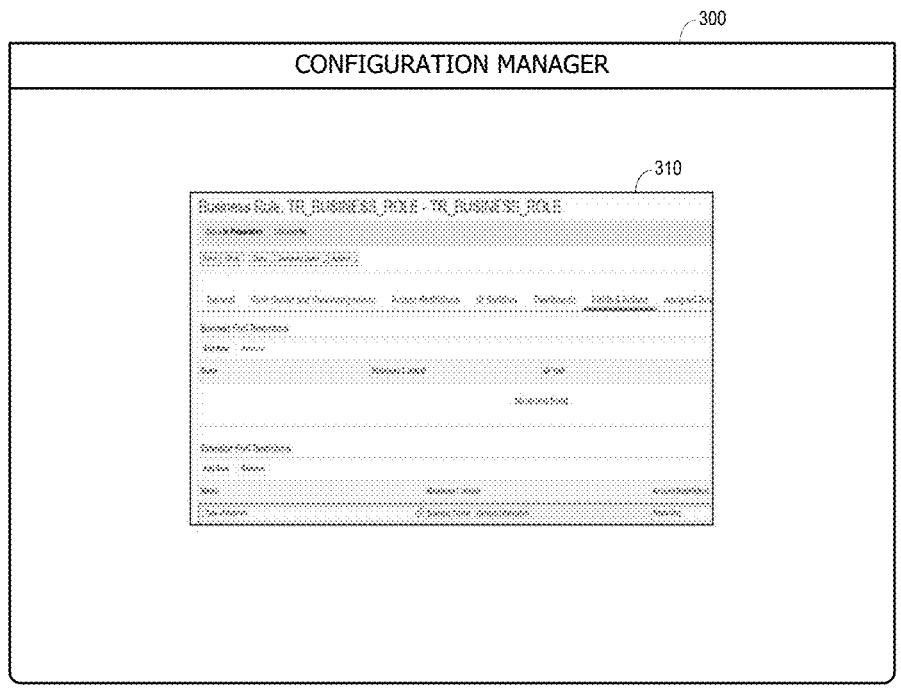
FIG. 3 is a view of a user interface depicting a customized entity according to some embodiments.

FIG. 3 illustrates user interface 300 of a configuration manager application to define an entity according to some embodiments. The configuration manager application may be provided by platform 110 and accessed via client application 125 by a user authorized to make configuration changes in tenant T1. Window 310 is associated with a newly-defined business role entity TR_BUSINESS_ROLE. As shown, the business role is associated with an extension field restriction.

At S205, a request to transport settings from a source tenant to a target tenant is initiated. With respect to architecture 100, the request may be initiated via a communication from client application 125 to transport framework 115. For example, initiation of a request may comprise accessing of a transport management user interface provided by transport framework 115.

Figure 4:
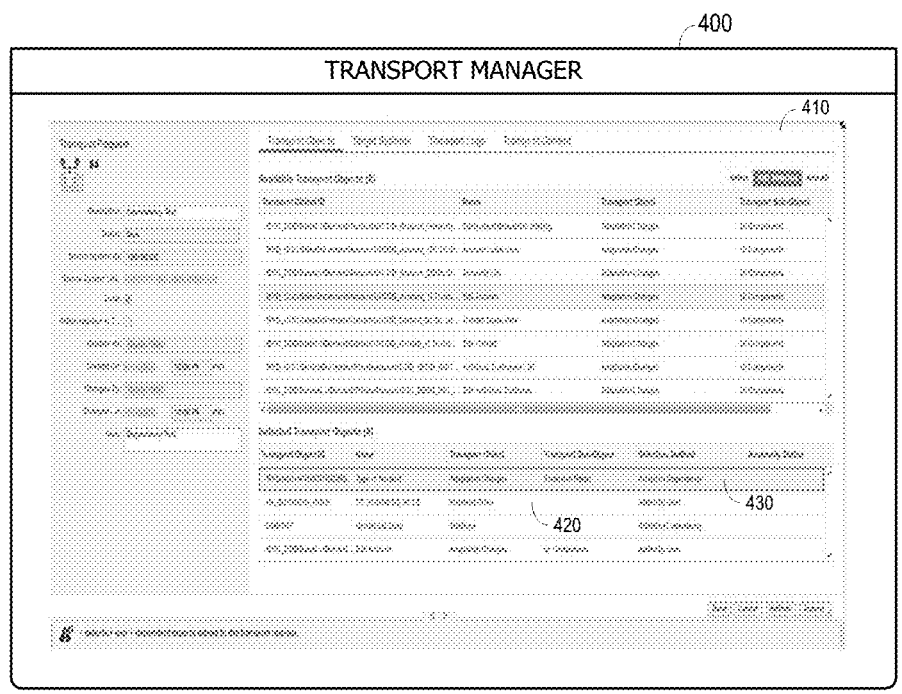
FIG. 4 is a view of a user interface to select entities for transport and indicate dependent entities according to some embodiments.

Next, at S210, an indication of an entity to add to the transport request is received. FIG. 4 illustrates user interface 400 of a transport manager application provided by transport framework 115 according to some embodiments. Window 410 lists the transportable entities (i.e., transportable objects) of tenant T1, and allows selection of one or more of the entities for addition to a transport request.

It will be assumed that the business role entity TR_BUSINESS_ROLE has been selected for addition to the transport request at S210, as shown in row 420 of Selected Transport Objects area of window 410. At S215, it is determined whether the entity type of the selected entity is compatible with dependent entities. According to the present example, S215 comprises accessing an entry of registry 111 which corresponds to the business role entity type to determine if entities of the business role entity type are permitted to be associated with dependent entities. If not, flow proceeds to S245 to determine whether more entities are to be added to the transport request. If no more entries are to be added, process 200 terminates and the transport request may move to a next stage (e.g., request assembly).

Flow proceeds to S220 if it is determined at S215 that the entity type of the selected entity is compatible with dependent entities. At S220, it is determined whether the selected entity is associated with any mandatory dependent entities. S220 may comprise querying an entity provider 112 for a list of entities which have a mandatory dependent relationship with the selected entity. In the present example, transport framework 115 queries an entity provider 112 associated with the business role entity type for mandatory-dependent entities associated with the business role entity TR_BUSINESS_ROLE.

In response, the entity provider 112 returns the dependent extension field shown in FIG. 3 and flow therefore proceeds from S220 to S225. The returned entity is automatically added to the transport request at S225, as shown in row 430 of window 410. Row 420 also indicates that the entity was added to the request based on its dependency on another added entity.

Nest, at S230, it is determined whether the entity type of the just-added entity is dependency-compatible. S230 proceeds as described above with respect to S215, based on the entity type (e.g., type: adaptation change/subtype: extension field) of the entity added at S225. If the determination at S230 is affirmative, flow returns to S220 to determine if any mandatory dependencies are associated with the entity. S220, S225 and S230 therefore provide a recursive mechanism to identify any chains of mandatory dependencies and to add each entity of the chains to the transport request.

Flow proceeds from S230 to S235 if the determination at S230 is negative. Flow also proceeds to S235 from S220 if an added entity is determined to not be associated with a mandatory dependency at S220.

Figure 5:
FIG. 5 is a view of a user interface to indicate optional dependent entities according to some embodiments.

S235 comprises a determination of whether any optional dependencies are associated with the entity indicated at S210 or with any mandatory entities added at S225. Optional dependencies may be determined similarly to the determination of mandatory dependencies. For example, an entity provider 112 associated with the entity type of the added entity is queried to identify any optionally-dependent entities of the added entity. FIG. 5 shows window 510 including a proposed dependent entity (Proposed Objects) and the added entity (Source Objects) based on which the proposed entity was determined. The user may select proposed entities from window 510 to be added to the transport request. Any such selected entities are added to the transport request at S240. Flow then proceeds to S245 and continues as described above.

Figure 6:
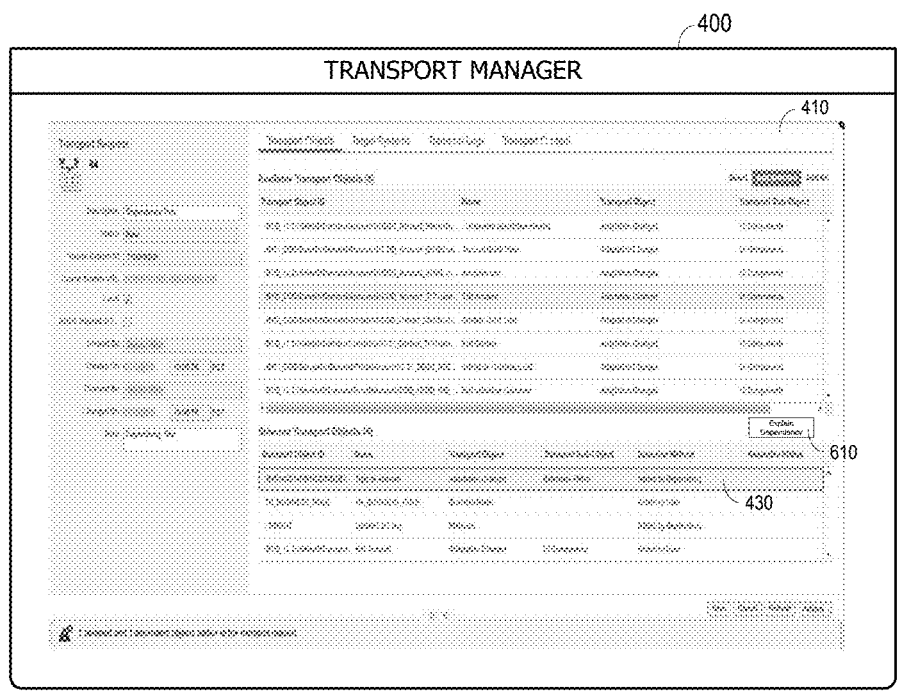
FIG. 6 is a view of a user interface to select entities for transport and indicate dependent entities according to some embodiments.

FIG. 6 illustrates above-described user interface 400. User interface 400 of FIG. 6 includes Explain Dependencies control 610. A user may select Explain Dependencies control 610 to obtain additional information on the dependent relationships of an entity which was added to the transport request in view of a dependency as described above.

Figure 7:
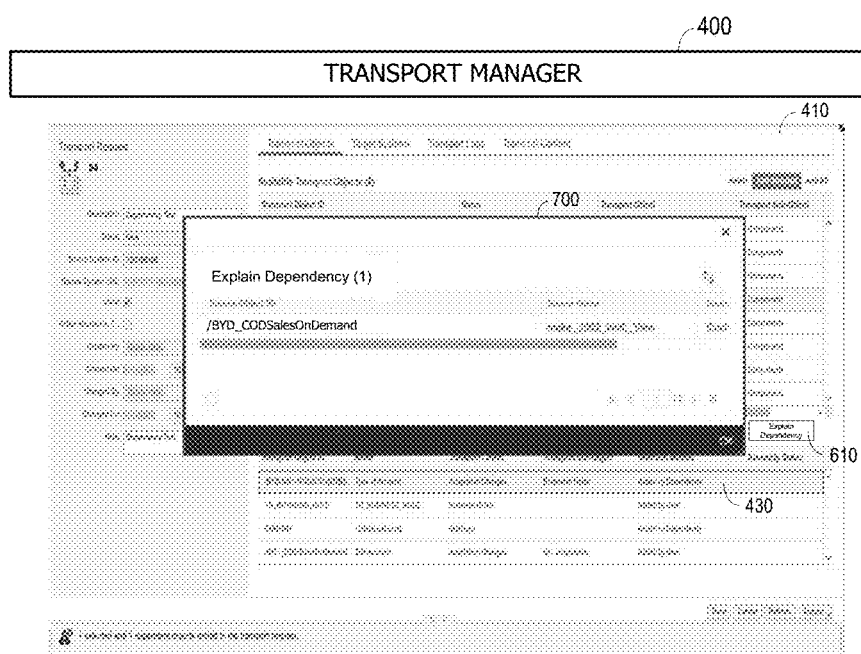
FIG. 7 is a view of a user interface to list entities from which a transport entity depends according to some embodiments.

It will be assumed that control 610 is selected while entity 430 of interface 400 is selected. FIG. 7 illustrates window 700 which may be presented in response to the selection according to an example. Window 700 lists the "source" entity of the dependency which caused selected entity 430 to be added to the transport request. Accordingly, as described above, selected entity 430 is dependent on the listed source entity, either via a mandatory dependency or an optional dependency.

Figure 8:
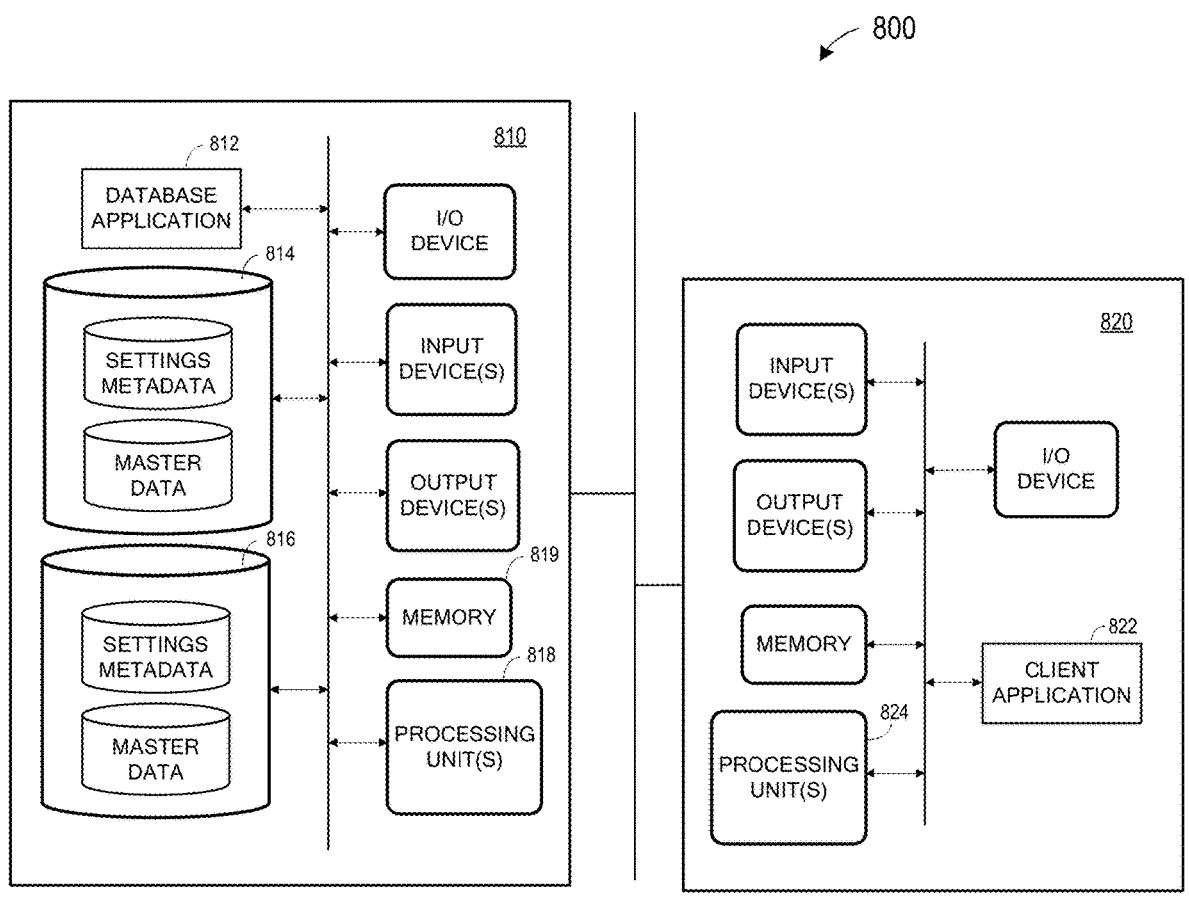
FIG. 8 is a block diagram of a multi-tenant architecture according to some embodiments.

FIG. 8 is a block diagram of system 800 according to some embodiments. System 800 includes platform 810, which may comprise an implementation of platform 110 of FIG. 1. Client system 820 may comprise an implementation of client device 120 of FIG. 1. According to some embodiments, platform 810 may communicate simultaneously with many client systems operated by users having many different roles. Either of platform 810 and client system 820 may comprise a general-purpose computing apparatus and may execute program code to perform any of the functions described herein. Platform 810 and client system 820 may include other unshown elements according to some embodiments.

Database application 812 may comprise program code executed by processing unit(s) 818 to cause platform 810 to perform any one or more of the processes described herein. Embodiments are not limited to execution of these processes by a single apparatus. Database application 812 may support multi-tenant operation and transport of tenant configuration settings between tenants.

Tenant stores 814 and 816 store settings metadata and master data for each tenant in a segregated manner as is known in the art. All data storage mentioned herein may be provided via combinations of magnetic storage devices (e.g., magnetic tape, hard disk drives and flash memory), optical storage devices, Read Only Memory (ROM) devices, etc., while memory 819 may comprise Random Access Memory (RAM), Storage Class Memory (SCM) or any other fast-access memory.

Client system 820 may comprise any computing system capable of presenting user interfaces, receiving input thereto, and communicating with platform 810. Client system 820 may be implemented by a desktop computing system, a laptop computing system, a tablet computer, a smartphone, etc. Client application 822 may comprise program code executed by processing unit(s) 824 to cause client system 820 to perform any one or more of the processes described herein. Embodiments are not limited to execution of these processes by a single apparatus.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a memory storing processor-executable process steps;
a processing unit to execute the processor-executable process steps to cause the system to:
receive an indication of a first data object of a first database tenant to add to a transport request to transmit the first data object from the first database tenant to a second database tenant, the first data object being associated with a first entity type and comprising configuration settings of a database application;
determine, based on a registry entry for the first entity type associated with the first data object, whether the first entity type of associated with the first data object is permitted, whether optional or mandatory, to be associated with a dependent object of the first database tenant;
in an event it is determined that the first entity type of the first data object is permitted to be associated with a dependent object, determine a first dependent object associated with the first data object;
determine whether the first dependent object associated with the first data object is one of a mandatory dependent of the first data object and an optional dependent of the first data object;
automatically add, in the instance the first dependent object is determined to be a mandatory dependent of the first data object, to the transport request in addition to the first data object, the first dependent object to transmit from the first database tenant to the second database tenant.

2. A system according to claim 1, the processing unit to execute the processor-executable process steps to cause the system to:
present an indicator of the first dependent object;
receive an instruction to present a data object on which the first dependent object is dependent;
in response to the instruction, present an indicator of the first dependent object.

3. A system according to claim 1, the processing unit to execute the processor-executable process steps to cause the system to:
in an event it is determined that a first entity type of the first dependent object is permitted to be associated with a dependent object, determine a second dependent object associated with the first dependent object.

4. A system according to claim 1,
wherein determination of the first dependent object associated with the first data object comprises querying of a first provider associated with the first entity type.

5. A system according to claim 4, the processing unit to execute the processor-executable process steps to cause the system to:
receive an indication of a second data object to add to a transport request to transmit the second data object from the first database tenant to the second database tenant, the second data object being associated with a second entity type and comprising configuration settings of the database application;
determine whether the second entity type of the second data object is permitted to be associated with a dependent object based on the second entity type;
in an event it is determined that a second entity type of the second data object is permitted to be associated with a dependent object, determine a second dependent object associated with the second data object by querying a second provider associated with the second entity type.

6. A system according to claim 1, the processing unit to execute the processor-executable process steps to cause the system to:
determine one or more other dependent objects associated with the first data object;
receive a selection of one or more of one or more other dependent objects; and
add to the transport request, the selected other dependent objects to transmit from the first database tenant to the second database tenant.

7. A system according to claim 6, wherein determination of whether a first entity type of the first data object is permitted to be associated with a dependent object is based on the first entity type,
wherein determination of the first dependent object associated with the first data object comprises querying of a first provider associated with the first entity type, and
wherein determination of the one or more other dependent objects comprises querying of the first provider.

8. A computer-implemented method comprising:
receiving an indication of a first data object of a first database tenant to add to a transport request to transmit the first data object from a first database tenant to a second database tenant, the first data object being associated with a first entity type and comprising user configuration settings metadata of a database application and associated with a first data object type;
determining, based on a registry entry for the first entity type associated with the first data object, whether the first entity type associated with the first data object is permitted, whether optional or mandatory, to be associated with a data object of the first database tenant;
in an event it is determined that the first entity type of the first data object is permitted to be associated with a data dependent object, determining a first dependent object associated with the first data object;
determining whether the first dependent object associated with the first data object is one of a mandatory dependent of the first data object and an optional dependent of the first data object; and
in an event it is determined that the first dependent object is a mandatory dependent of the first data object, automatically add to the transport request, in addition to the first data object, the first dependent object to transmit from the first database tenant to the second database tenant.

9. A method according to claim 8, further comprising:
presenting an indicator of the first dependent object;
receiving an instruction to present a data object on which the first dependent object is dependent;
in response to the instruction, presenting an indicator of the first dependent object.

10. A method according to claim 8, further comprising:
in an event it is determined that a first entity type of the first dependent object is permitted to be associated with a dependent object, determining a second dependent object associated with the first dependent object.

11. A method according to claim 8,
wherein the determination of the dependent object comprises querying of a first provider associated with the first entity type.

12. A method according to claim 11, further comprising:
receiving an indication of a second data object to add to a transport request to transmit the second data object from the first database tenant to the second database tenant, the second data object comprising user configuration settings metadata of a database application and being associated with a second data entity type;
determining whether a dependent data object is permitted to be associated with a data object of the second data entity type;
in an event it is determined that a dependent data object is permitted to be associated with a data object of the second data entity type, determining whether a dependent object is dependent on the second data object; and
in an event it is determined that a second dependent object is dependent on the second data object, automatically determining to transmit the second dependent object from the first database tenant to the second database tenant.

13. A method according to claim 8, further comprising:
determining one or more other dependent objects;
receiving a selection of one or more of one or more other dependent objects; and
adding to the transport request to transmit the selected other dependent objects from the first database tenant to the second database tenant.

14. A method according to claim 13, wherein the determination of whether a dependent data object is permitted to be associated with a data object of the first entity type is based on the first entity type,
wherein the determination of the dependent object comprises querying of a first provider associated with the first entity type, and
wherein determination of the one or more other dependent objects comprises querying of the first provider.

15. A system comprising:
a first database tenant associated with first data, a first plurality of object providers, and first configuration settings metadata, each of the first plurality of object providers associated with a respective entity type of configuration settings data object;
a second database tenant associated with second data, a second plurality of object providers, and second configuration settings metadata, each of the second plurality of object providers associated with a respective entity type of configuration settings data object; and
a transmit system comprising:
a memory storing processor-executable process steps;
a processor to execute the processor-executable process steps to cause the transmit system to:
receive an indication of a first configuration settings metadata object of the first database tenant to add to a transport request to transmit the first configuration settings metadata object from the first database tenant to the second database tenant;
determine, based on a registry entry for a first entity type associated with the first configuration settings metadata object, whether the first entity of the first configuration settings metadata object is permitted, whether optional or mandatory, to be associated with a dependent configuration settings metadata object of the first database tenant;
in an event it is determined that the first entity type of the first configuration settings metadata object is permitted to be associated with a dependent configuration settings metadata object, determine a first dependent configuration settings metadata object associated with the first configuration settings metadata object;
determine whether the first dependent configuration settings metadata object associated with the first configuration settings metadata object is one of a mandatory dependent of the first configuration settings metadata object and an optional dependent of the first configuration settings metadata object; and
automatically add, in the instance the first dependent configuration settings metadata object is determined to be a mandatory dependent of the first configuration settings metadata object, to the transport request in addition to the first configuration settings metadata object, the first dependent configuration settings metadata object to transmit from the first database tenant to the second database tenant.

16. A system according to claim 15, the transmit system to:
present an indicator of the first dependent configuration settings metadata object;
receive an instruction to present a data configuration settings metadata object on which the first dependent configuration settings metadata object is dependent;
in response to the instruction, present an indicator of the first dependent configuration settings metadata object.

17. A system according to claim 15, the transmit system to:
in an event it is determined that a first entity type of the first dependent configuration settings metadata object is permitted to be associated with a dependent configuration settings metadata object, determine a second dependent configuration settings metadata object associated with the first dependent configuration settings metadata object.

18. A system according to claim 15,
wherein determination of the first dependent configuration settings metadata object associated with the first configuration settings metadata object comprises querying of a first provider associated with the first type.

19. A system according to claim 18, the transmit system to:
receive an indication of a second configuration settings metadata object of the first configuration settings metadata to add to a transport request to transmit the second configuration settings metadata object from the first database tenant to of the second database tenant, the second configuration settings metadata object being associated with a second entity type;
determine whether the second entity type of the second configuration settings metadata object is permitted to be associated with a dependent configuration settings metadata object based on the second entity type;
in an event it is determined that a second entity type of the second configuration settings metadata object is permitted to be associated with a dependent configuration settings metadata object, determine a second dependent configuration settings metadata object associated with the second configuration settings metadata object by querying the plurality of second object providers associated with the second entity type; and automatically add to the transport request the second dependent configuration settings metadata object to transmit from the first database tenant to the second database tenant.

20. A system according to claim 15, the transmit system to:
   determine one or more other dependent configuration settings metadata objects;
   receive a selection of one or more of one or more other dependent configuration settings metadata objects; and
   add to the transport request, the selected other dependent configuration settings metadata objects to transmit from the first database tenant to the second database tenant.

\* \* \* \* \*